(12) United States Patent
Kawamura et al.

(10) Patent No.: US 7,647,060 B2
(45) Date of Patent: Jan. 12, 2010

(54) WIRELESS COMMUNICATIONS SYSTEM AND METHOD USING TRANSMISSION TIMING CONTROL

(75) Inventors: Teruo Kawamura, Yokosuka (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 276 days.

(21) Appl. No.: 10/959,190

(22) Filed: Oct. 7, 2004

(65) Prior Publication Data

US 2005/0088996 A1    Apr. 28, 2005

(30) Foreign Application Priority Data

Oct. 24, 2003 (JP) .............................. 2003-364756

(51) Int. Cl.
*H04B 15/00* (2006.01)
*H03C 1/62* (2006.01)
*H04B 17/00* (2006.01)

(52) U.S. Cl. ................. 455/502; 455/115.1; 455/115.2; 370/335; 370/350; 370/503

(58) Field of Classification Search ................ 455/502, 455/115.1, 115.2, 115; 370/335, 350, 503
See application file for complete search history.

(56) References Cited

U.S. PATENT DOCUMENTS

| | | | | |
|---|---|---|---|---|
| 5,151,919 A | * | 9/1992 | Dent ........................... | 370/209 |
| 5,235,615 A | * | 8/1993 | Omura ......................... | 370/342 |
| 5,295,152 A | * | 3/1994 | Gudmundson et al. ...... | 370/342 |
| 5,983,113 A | * | 11/1999 | Asanuma .................... | 455/506 |
| 6,141,337 A | * | 10/2000 | Uta et al. .................... | 370/350 |
| 6,351,459 B1 | * | 2/2002 | Kondo ........................ | 370/330 |

(Continued)

FOREIGN PATENT DOCUMENTS

JP    7-502398    3/1995

(Continued)

OTHER PUBLICATIONS

Noriyuki Maeda, et al., "Experimental Evaluation of Throughput Performance in Broadband Packet Wireless Access Based on VSF-OFCDM and VSF-CDMA", IEEE PIMRC, Sep. 2003, 6 pages.

(Continued)

*Primary Examiner*—Matthew D Anderson
*Assistant Examiner*—Wen W Huang
(74) *Attorney, Agent, or Firm*—Oblon, Spivak, McClelland, Maier & Neustadt, L.L.P.

(57) ABSTRACT

A wireless communications system includes a base station and multiple mobile stations performing wireless communication with the base station in a DS-CDMA scheme. Each of the mobile stations has a transmission unit configured to transmit a timing difference detection packet to the base station, prior to transmitting packet data. The base station has a transmission timing control unit configured to detect a difference in signal receive timing from the mobile stations based on the timing difference detection packet, produce transmission timing control information for each of the mobile stations based on the detection result, and supply the transmission timing control information to each of the mobile stations to cause the mobile stations to adjust the transmission timing of the packet data.

17 Claims, 12 Drawing Sheets

U.S. PATENT DOCUMENTS

| | | | |
|---|---|---|---|
| 6,421,334 B1 * | 7/2002 | Baines | 455/65 |
| 7,151,944 B2 * | 12/2006 | Hashem et al. | 455/502 |
| 2002/0177412 A1 * | 11/2002 | Hiramatsu et al. | 455/63 |
| 2003/0058833 A1 | 3/2003 | Hashem et al. | |
| 2005/0100082 A1 * | 5/2005 | Ma | 375/148 |

FOREIGN PATENT DOCUMENTS

| | | |
|---|---|---|
| JP | 2000-286784 | 10/2000 |
| JP | 2001-16159 | 1/2001 |
| JP | 2001-148641 | 5/2001 |

OTHER PUBLICATIONS

Een-Kee Hong, et al., "Synchronous Transmission Technique for the Reverse Link in DS-CDMA Terrestrial Mobile Systems", IEEE Transactions on Communications, vol. 47, No. 11, Nov. 1999, pp. 1632-1635.

"Study Report for Uplink Synchronous Transmission Scheme (USTS)", 3GPP TR 25.854, Dec. 2001, pp. 1-46.

* cited by examiner

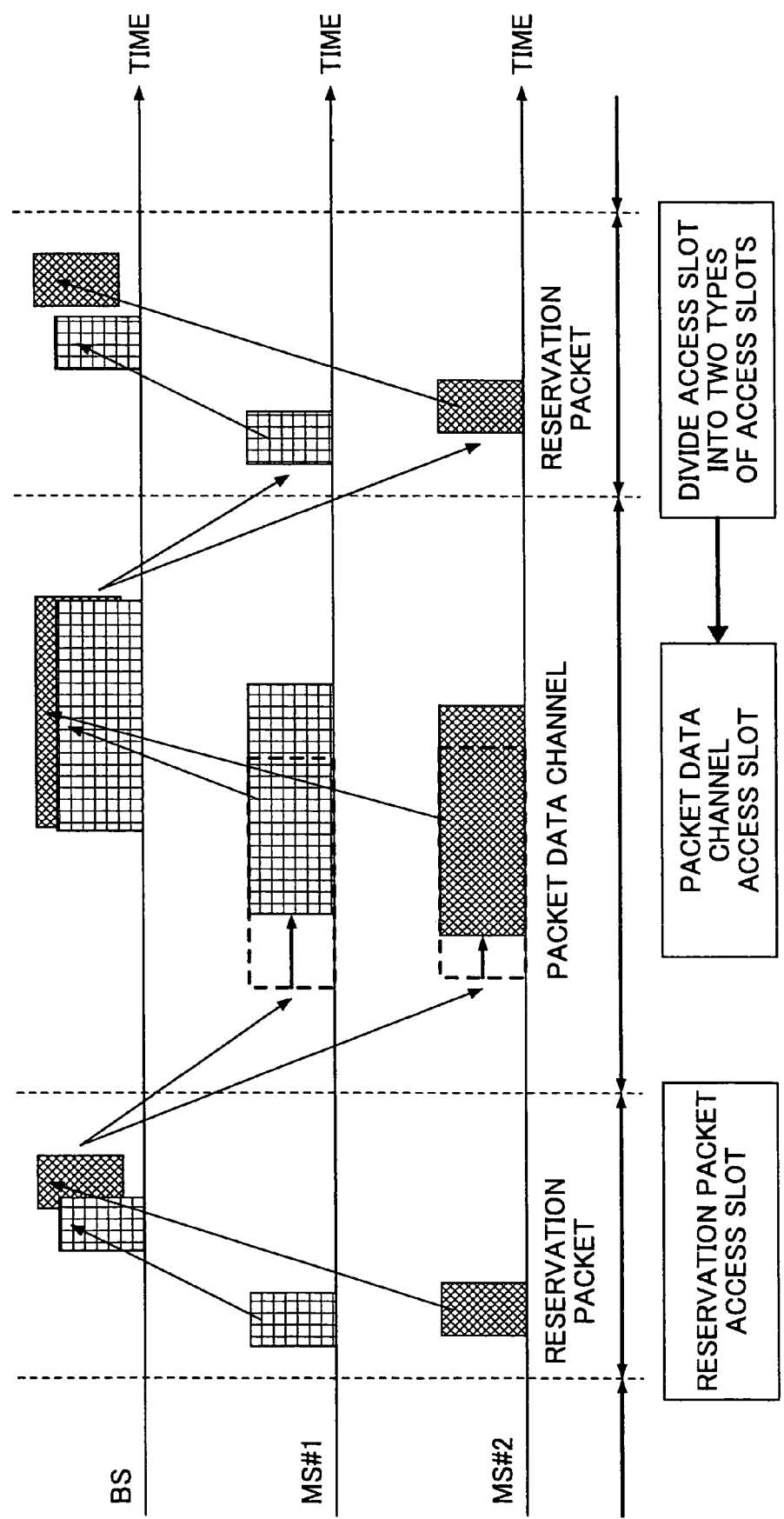

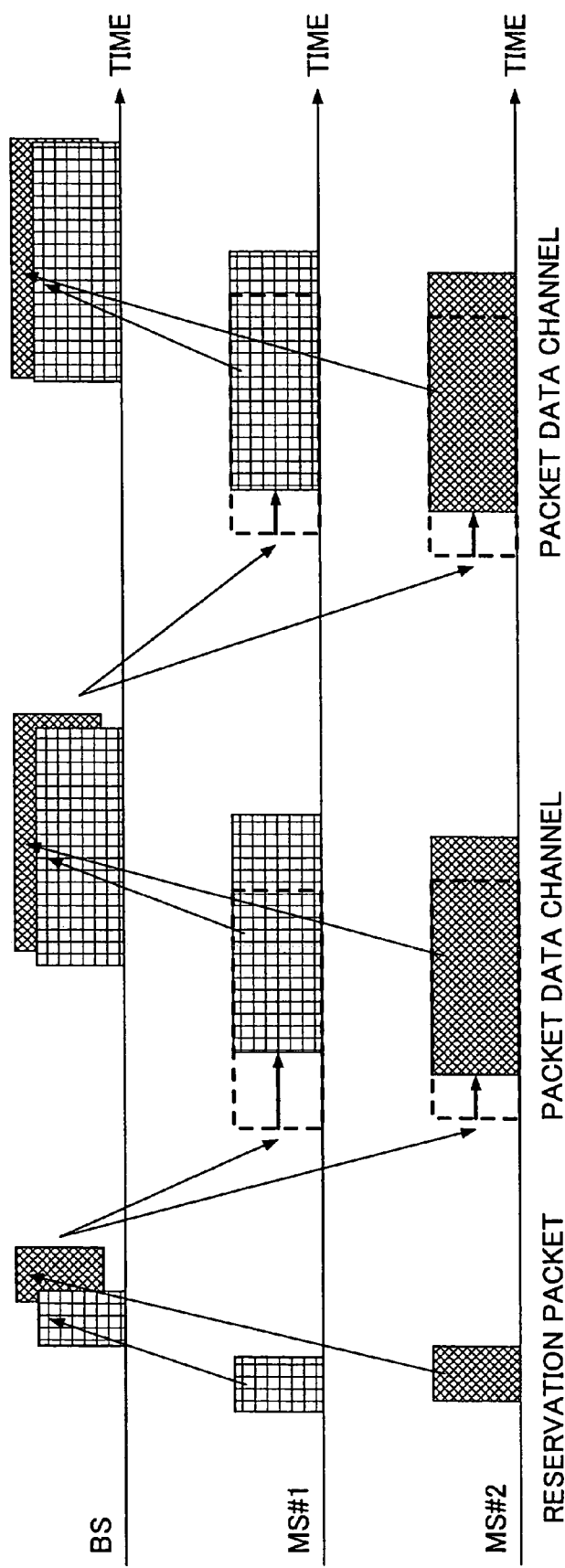

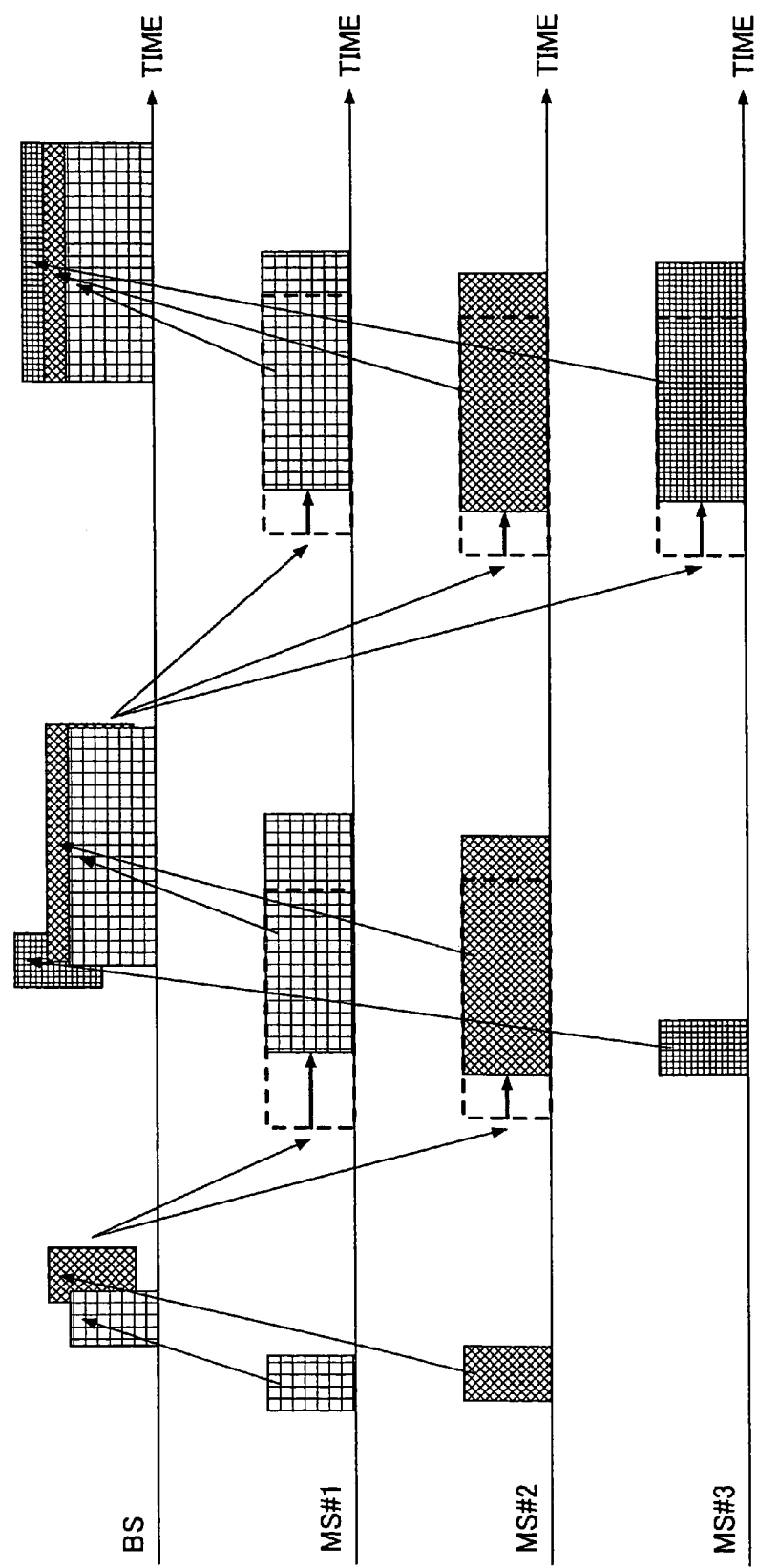

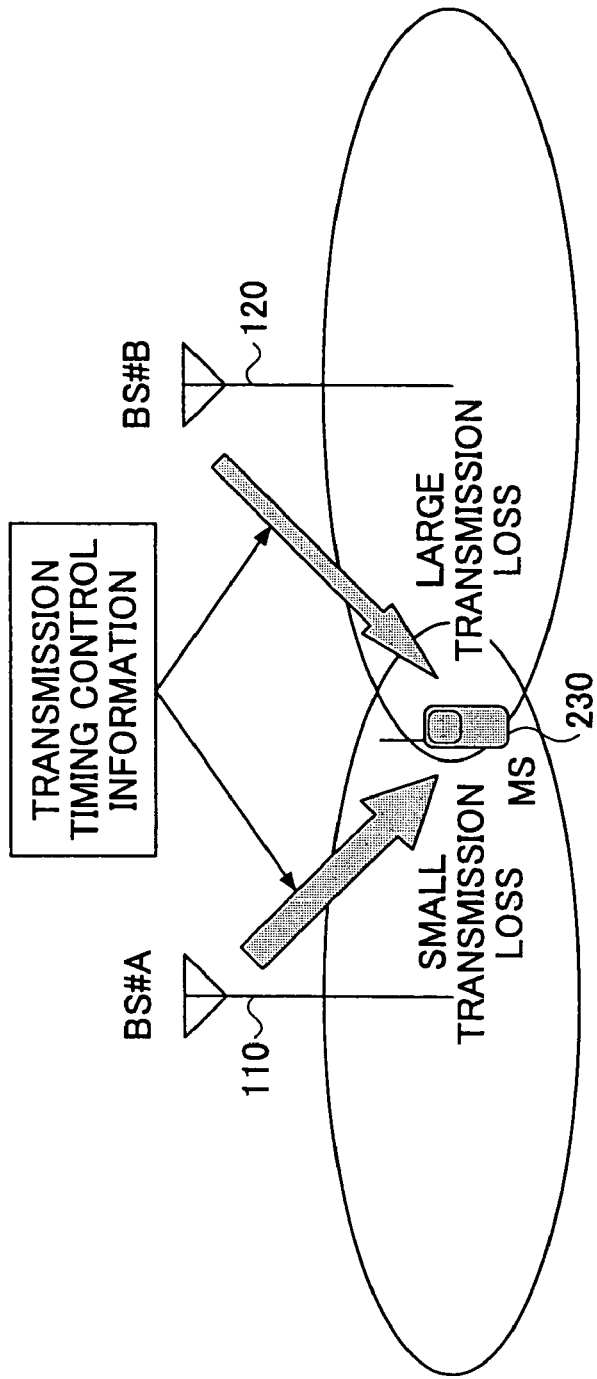

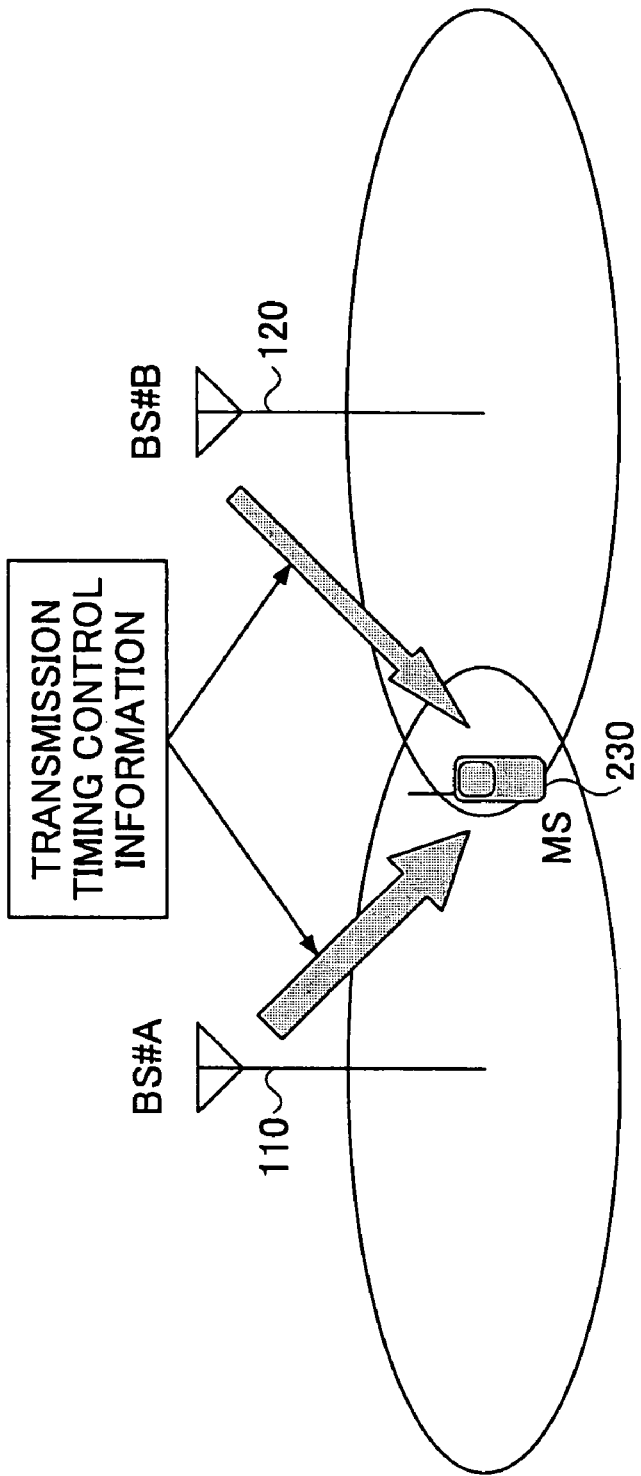

WIRELESS COMMUNICATIONS SYSTEM AND METHOD USING TRANSMISSION TIMING CONTROL

BACKGROUND OF THE INVENTION

The present invention generally relates to a wireless communication technique, and more particularly to a wireless communications system, a base station, and a mobile station that realize orthogonalization of uplink paths with the maximum receive-power among multiple users.

Succeeding the International Mobile Telecommunication 2000 (IMT-2000), which is the global standard for the third generation wireless communications, the fourth generation wireless communications system is being developed. For example, a technique is proposed to flexibly and totally support systems throughout the environment, covering the multicell environment for cellular systems and the isolated cell environment including hot spot areas and indoor spaces, and to improve the frequency use efficiency under both types of cell environment. See N. Maeda, Y. Kishiyama, K. Higuchi, H. Atarashi, and M. Sawahashi, "Experimental Evaluation of Throughput Performance in Broadband Packet Wireless Access Based on VSF-OFCDM and VSF-CDMA", IEEE PIMRC, September 2003.

In this publication, direct sequence-code division multiple access (DS-CDMA) is discussed as the major candidate for the wireless access protocol applied to the reverse link from a mobile station to a base station in the fourth generation wireless communications system.

However, when applying the DS-CDMA to the uplink or the reverse link, the adverse affect of multiple access interference (MAI) increases. Multiple access interference is mutual interference between signals from mobile stations due to different propagation conditions (such as transmission delay time or link fluctuation). To reduce multiple access interference, a transmission timing control technique is proposed and discussed in Een-Kee Hong, Seugn-Hoon Hwang and Keum-Chang Whang, "Synchronous Transmission Technique for the Reverse Link in DS-CDMA Terrestrial Mobile Systems," pp. 1632-1635, Vol. 46, No. 11, IEEE Trans. on Commun., November, 1999. In this transmission timing control, orthogonal spreading codes are assigned to the respective accessing users using a common scramble code among cells, and transmission timing is controlled such that the receive timings of signals from the accessing users agree with each other at the base station.

Multiple access interference among simultaneously accessing users can be reduced by bringing the receive timing of signals from the accessing users in agreement with each other at the base station, and the frequency use efficiency can be improved by using orthogonal spreading codes.

On the other hand, the Third Generation Partnership Project (3GPP), which is a collaboration project for developing technical specifications for IMT-2000 wireless access protocols and backbone networks, proposes a transmission timing control technique for DS-CDMA wireless access in the circuit switching mode mainly for low-rate voice communication channels. See "Study Report for Uplink Synchronous Transmission Scheme (USTS)", 3GPP TR 25.854.

With this proposal, to realize orthogonalization among user signals, 10-milisecond-length random access channels of the respective users are used for the first synchronization, and transmission delay times are measured in the continuously transmitted data channels to complement synchronization among users.

However, it is expected that the main stream of wireless signal transmission is shifting from continuous transmission for voice communications to burst packet data transmission.

The transmission timing control discussed in the latter publication is on the basis of the circuit-switching mode for low-rate speech channels. In reality, it is difficult to bring the receive timings of a number of low-rate physical channels in a moment. Because of a large number of physical channels, it is hardly expected that multiple access interference can be reduced effectively through orthogonalizaiton of the respective physical channels.

In addition, due to the large number of simultaneously accessing physical channels, processing workload increases, and the throughput and/or the process efficiency cannot be improved.

In contrast, in the packet transmission in wireless sections, the number of simultaneously accessing physical channels in a time slot is less, as compared with the former case. Consequently, it is expected that multiple access interference can be reduced effectively through orthogonalization of simultaneously accessing user signals by controlling transmission timings.

SUMMARY OF THE INVENTION

Therefore, it is an object of the present invention to provide a wireless communications technique for packet transmission that can reduce adverse influence of multiple access interference and improve the packet transmission efficiency. To be more precise, it is an object of the invention to provide a wireless communication system, including a base station and multiple mobile stations, that realizes transmission timing control of packet data for each of the mobile stations so as to reduce multiple access interference.

In one aspect of the invention, a mobile station performing wireless communication with a base station using a DS-CDMA protocol is provided. The mobile station comprises a packet transmission unit configured to transmit a timing difference detection packet for allowing the base station to detect deviation in receive timing among multiple mobile stations, and a transmission timing adjusting unit configured to adjust transmission timing of packet data according to transmission timing control information supplied from the base station.

With this arrangement, packet data transmission timing is adjusted at the mobile station based on the transmission timing control information produced by the base station based on the timing difference detection packet.

The timing difference detection packet is, for example, a reservation packet transmitted using a slotted ALOHA random access scheme.

The timing difference detection packet is transmitted by the mobile station, prior to transmitting the packet data.

Preferably, the mobile station further comprises an access slot dividing unit configured to divide an access slot allocated to the mobile station into a reservation packet access slot and a packet data access slot, based on broadcast information from the base station.

In another aspect of the invention, a base station that communicates with a plurality of mobile stations is provided. The base station comprises a signal processing unit configured to detect a signal receive timing from one of the mobile stations based on a timing difference detection packet transmitted from said one of the mobile stations, and a transmission timing control unit configured to detect a difference in signal receive timing from the mobile stations and produce transmission timing control information for controlling transmission timing of packet data for each of the mobile stations, based on the detected difference.

With this arrangement, the base station can control the packet data transmission timing of each mobile station based on the signal receive timing difference among the mobile stations. Consequently, orthogonalization (or synchronization) of received signals from the mobile stations is achieved at the base station, reducing multiple access interference.

Preferably, the transmission timing control unit measures a deviation of signal receive timing due to transmission delay among mobile stations, based on the timing difference detection packet transmitted from the mobile station.

In a preferable example, the transmission timing control unit sets a reference timing, and measures the deviation of signal receive timing based on the difference between the reference timing and the receive timing of the timing difference detection packet from the mobile station.

In another preferable example, the signal processing unit detects a receive timing of the packet data transmitted from the mobile station after the transmission timing control, and the transmission timing control unit detects a second difference in receive timing of the packet data among the mobile stations. If the detected second difference is beyond a prescribed range, the transmission timing control unit produces second transmission timing control information for controlling transmission timing of the next packet data for each of the mobile stations.

In this case, the transmission timing control unit may have a tracking feature for repeating detection of difference in packet data receive timing and production of associated transmission timing control information until the detected difference converges within a prescribed range.

In a preferred example, the signal processing unit detects a receive timing of the packet data transmitted from the already connected mobile station after the transmission timing control, as well as a receive timing of a new timing difference detection packet from a newly accessing mobile station, to control the transmission timing of the packet data for each of the mobile stations and the newly accessing mobile station, based on the difference in the receive timings.

In still another aspect of the invention, a wireless communications system including a base station and a plurality of mobile stations performing wireless communications with the base station in a DS-CDMA scheme is provided. In this system, each of the mobile stations has a transmission unit configured to transmit a timing difference detection packet to the base station, prior to transmitting packet data. The base station has a transmission timing control unit configured to detect the difference in signal receive timing from the mobile stations based on the timing difference detection packet, produce transmission timing control information for each of the mobile stations based on the detection result, and supply the transmission timing control information to each of the mobile stations to cause the mobile stations to adjust the transmission timing of the packet data.

With this system, multiple access interference is reduced, and the frequency use efficiency of the system can be maintained high. Consequently, efficient packet transmission from a mobile station to the base station is realized.

BRIEF DESCRIPTION OF THE DRAWINGS

Other objects, features, and advantages of the invention will become more apparent from the following detailed description when read in conjunction with the accompanying drawings, in which

FIG. 8 is a schematic diagram illustrating an uplink access slot divided into two sub-slots, that is, a reservation packet access slot and a packet data channel access slot;

FIG. 9 is a schematic diagram for explaining transmission timing control according to the second embodiment of the invention;

FIG. 10 is a schematic diagram for explaining transmission timing control implemented when already connected mobile stations and a newly calling mobile station are coexisting in the system;

FIG. 11 is schematic diagram illustrating transmission timing control carried out during soft handover; and FIG. 12 is a schematic diagram illustrating transmission timing control carried out during hard handover.

DETAILED DESCRIPTION OF THE PREFERRED EMBODIMENT

The present invention is described in detail below in conjunction with the attached drawings.

Figure 1:
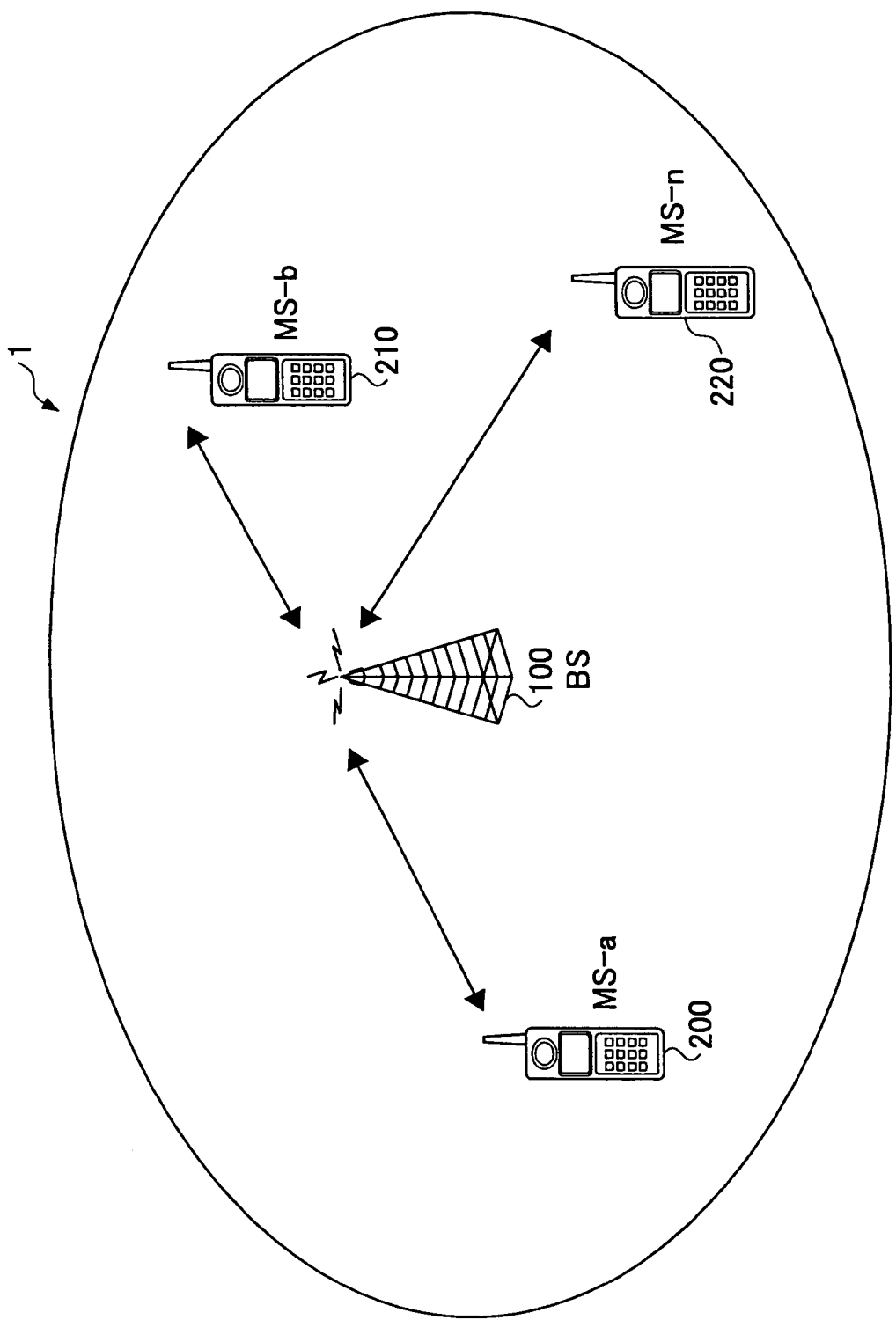
FIG. 1 is a schematic diagram illustrating a wireless communication system to which the present invention is applied.

FIG. 1 is a schematic diagram of a wireless communications system 1, to which the present invention is applied. The wireless communications system 1 includes a base station 100 and multiple mobile stations 200, 210, and 220. Each of the mobile stations 200, 210, and 220 is located within a wireless communication zone defined by the base station 100, and transmits an uplink channel to the base station 100 using a DS-CDMA scheme. The base station 100 establishes a wireless link to transmit a downlink channel to each of the mobile stations 200, 210, and 220.

Figure 2:
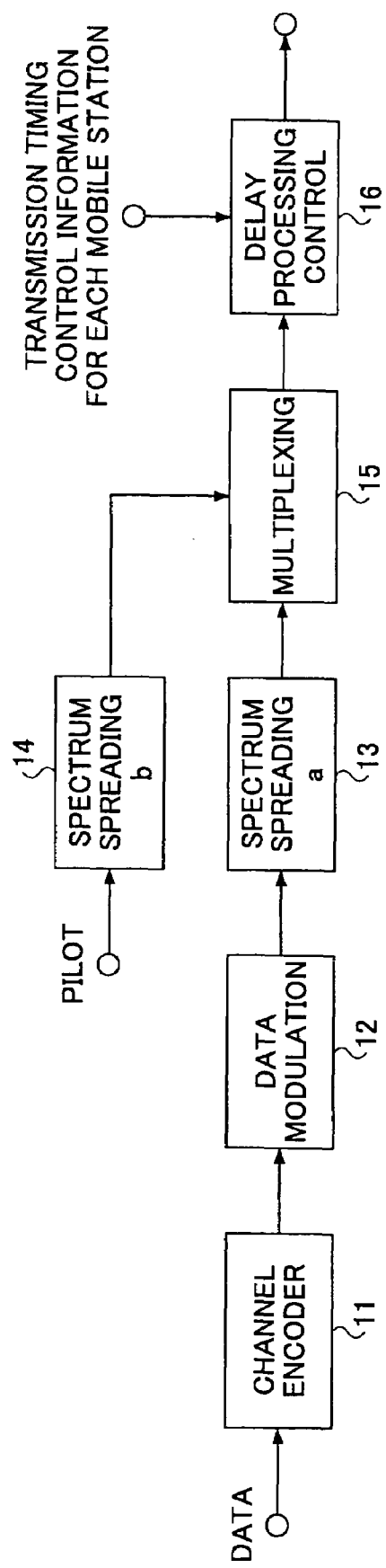
FIG. 2 is a block diagram of a mobile station used in the wireless communications system shown in FIG. 1.

FIG. 2 is a block diagram of the mobile station used in the wireless communications system 1 shown in FIG. 1. Since the mobile stations 200, 210, and 220 have the same structure, explanation is made of the mobile station (MSa) 200 in this embodiment.

The mobile station (MSa) 200 has a channel encoder 11, a data modulation unit 12, a first spectrum spreading unit 13, a second spectrum spreading unit 14, a multiplexer 15, and a delay process control unit 16. The channel encoder 11 applies error correction codes, such as turbo codes and convolutional codes, to a binary data sequence to perform channel coding. The data modulation unit 12 modulates the channel encoded data. The first spectrum spreading unit 13 multiplies the modulated data by a spreading code, and outputs the code-spread data to the multiplexer 15. The second spectrum spreading unit 14 multiplies a pilot channel by a spreading code, and outputs the code-spread pilot channel to the multiplexer 15. The multiplexer 15 combines the code-spread data channel with the code-spread pilot channel. The delay process control unit 16 adjusts transmission timing of the packet data signal based on transmission timing control information supplied from the base station 100.

In place of the code-multiplexing used in this embodiment, time-multiplexing may also be employed to combine the pilot channel and the packet data channel.

In operation, the mobile station (MSa) 200 employs a random access protocol, such as slotted ALOHA, as the access protocol to the base station 100. With the slotted ALOHA, time slots are set in the channel in order to reduce the probability of data collision, and data packets are timed so as to be transmitted at the beginning of the reference slot.

In this embodiment, the mobile station (MSa) 200 transmits a reservation packet to the base station 100 based on the slotted ALOHA random access protocol. A reservation packet is used to allow the base station 100 to detect a difference in receive timing of signals transmitted from mobile stations. When transmitting a reservation packet, the delay process control unit 16 does not perform transmission timing adjustment.

In transmitting the reservation packet and data packets, either code-multiplexing or time-multiplexing may be employed to combine the pilot channel with the data channel.

Figure 3:
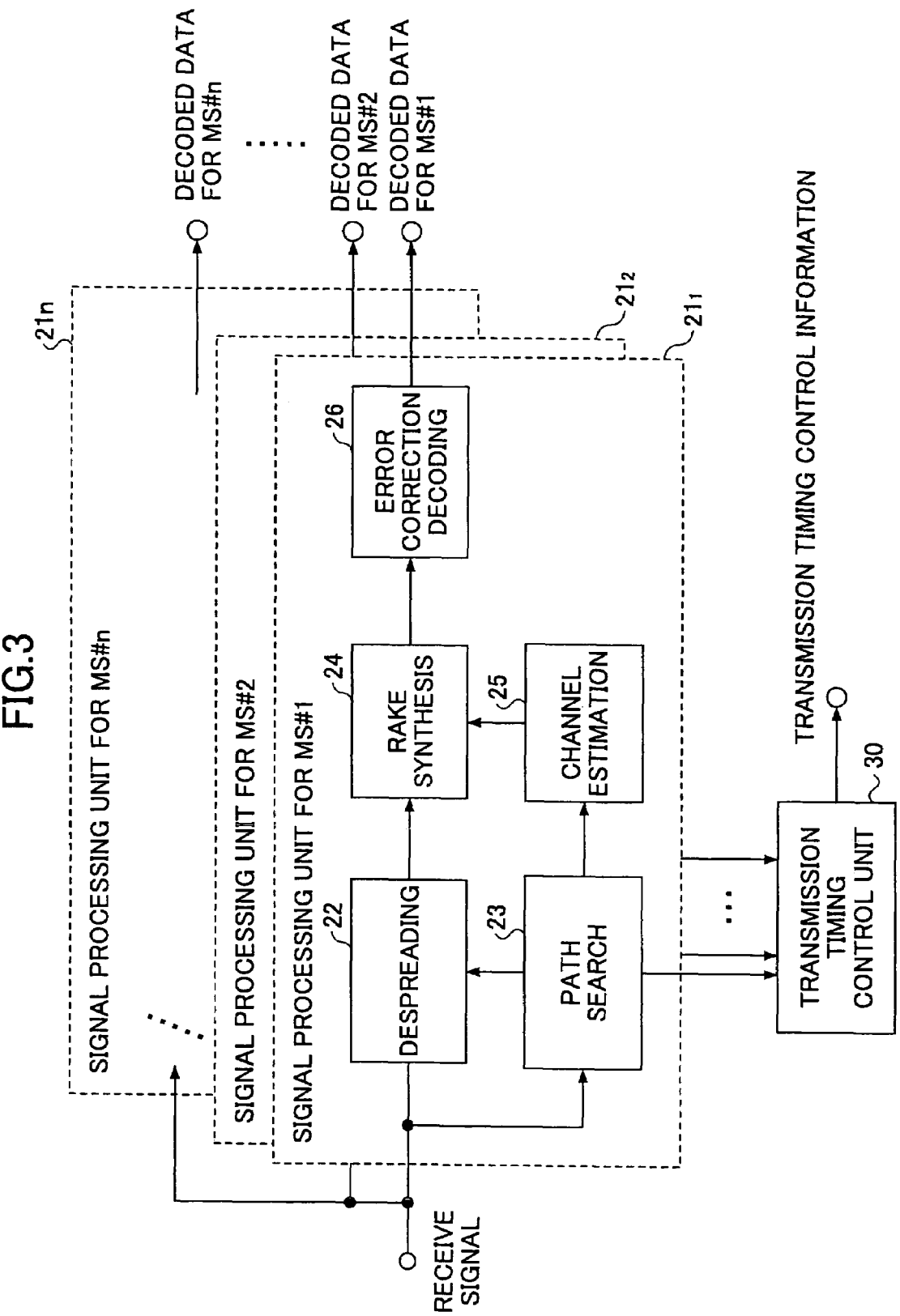
FIG. 3 is a block diagram of a base station used in the wireless communication system shown in FIG. 1.

FIG. 3 is a block diagram of the base station 100 used in the wireless communications systems shown in FIG. 1. The base station 100 has signal processing units $21_1$, through $21n$, each provided for one of the mobile stations #1 through #n (which correspond to, for example, mobile stations 200, 210, and 220 shown in FIG. 1), and a transmission timing control unit 30. The structures of the signal processing units $21_1$, through $21n$ for the mobile stations #1 through #n are the same, and therefore, explanation is made of the signal process unit $21_1$, provided for the mobile station #1.

The signal processing unit $21_1$, includes a despreading unit 22, a path searching unit 23, a RAKE synthesizing unit 24, a channel estimation unit 25, and an error correction decoder 26. The despreading unit 22 despreads the received signal transmitted using the DS-CDMA protocol from the mobile station #1, and outputs the despread signal to the RAKE synthesizing unit 24. The path searching unit 23 acquires a delay profile using a pilot channel, and searches for paths (or delay waves) with large receive powers based on the delay profile to determine the receive timings of the respective paths. The channel estimation unit 25 calculates a channel estimate based on the detected receive timings of the respective paths. The RAKE synthesizing unit 24 performs in-phase synthesis (RAKE synthesis) on the received paths. The error correction decoder 26 performs an error correction decoding process on the in-phase synthesized signal to reproduce the effective information for forming a frame. The reproduced information is output as decoded data. The transmission timing control unit 30 calculates an adjusting time for adjusting the transmission timing for each of the mobile stations #1 through #n.

In operation, the base station 100 receives a reservation packet from each of the mobile stations #1 through #n in this embodiment, and calculates the difference in receive timing among the signals from the mobile stations #1 through #n. To be more precise, the base station 100 detects the receive timing of each path and measures the receive power of each path based on the pilot channel multiplexed on the reservation packet. Then, the base station 100 selects the receive timing of a path with the maximum receive power for each of the mobile stations #1 through #n to determine a difference in receive timing due to transmission delay time difference among simultaneously accessing users. The base station 100 produces transmission timing control information for compensating for the difference in receive timing for each of the mobile stations #1 through #n, and supplies the transmission timing control information to the associated one of mobile stations #1 through #n in order to control the transmission timing of packet data to be transmitted from each of the mobile stations #1 through #n.

Figure 4:
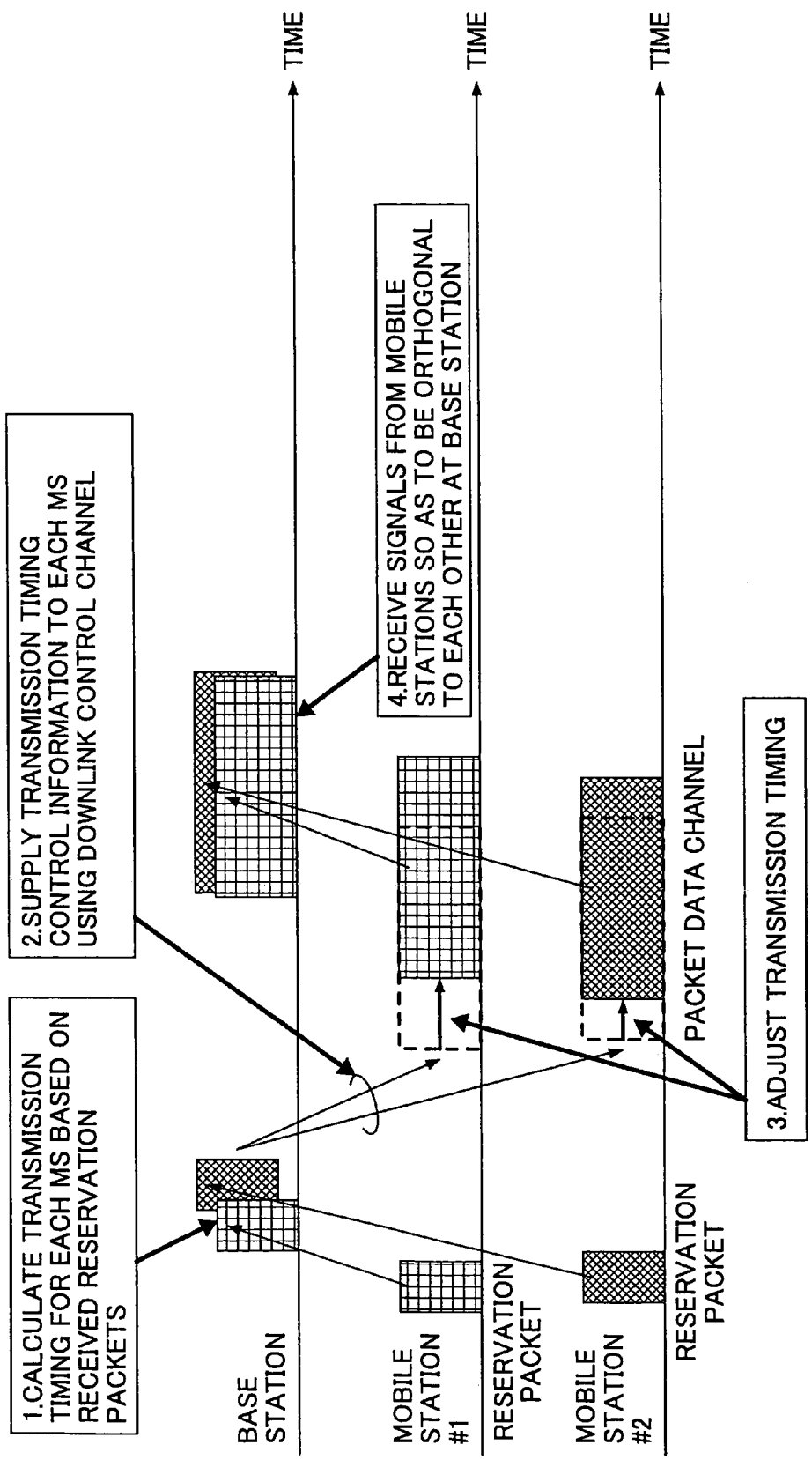
FIG. 4 is a schematic diagram for explaining transmission timing control according to the first embodiment of the invention.

Next, explanation is made of a transmission timing control method according to the first embodiment of the invention with reference to FIG. 4, which illustrates the transmission timing control method of the first embodiment.

(1) In the first embodiment, each of the mobile stations (mobile stations #1 and #2 in the example shown in FIG. 4) transmits a reservation packet to the base station, prior to actually transmitting the data channel carrying the data packets. The base station determines the difference in receive time of the reservation packets caused by transmission delay time difference, and calculates a transmission timing adjusting parameter for each of the mobile stations #1 and #2, based on the determination result, such that the subsequent packet data channels transmitted from the mobile stations #1 and #2 are to be received in sync at the base station.

(2) The transmission timing adjusting parameter is supplied as the transmission timing control information to the associated mobile station on downlink.

(3) Upon receiving the associated transmission timing control information from the base station, each of the mobile stations #1 and #2 adjusts the transmission timing according to the transmission timing control information, and then transmits the packet data channel.

(4) The packet data channels transmitted from the mobile stations #1 and #2 and received at the base station are orthogonal to each other.

In this manner, the base station uses the reservation packets transmitted from the respective mobile stations to detect a difference in receiving timing among the signals from the mobile stations, and produces transmission timing control information for each of the mobile stations so as to cancel the difference in receive timing. Each of the mobile stations receives the transmission timing control information from the base station, and adjusts the transmission timing. Consequently, orthogonalization of the maximum power paths between mobile stations is realized at the base station. The frequency use efficiency is improved, and uplink packet transmission is performed efficiently from a mobile station to the base station. To implement orthogonalization of the paths with the maximum receive power between mobile stations, a common scramble code is used in the mobile stations, or alternatively, the scramble codes are removed.

Figure 5:
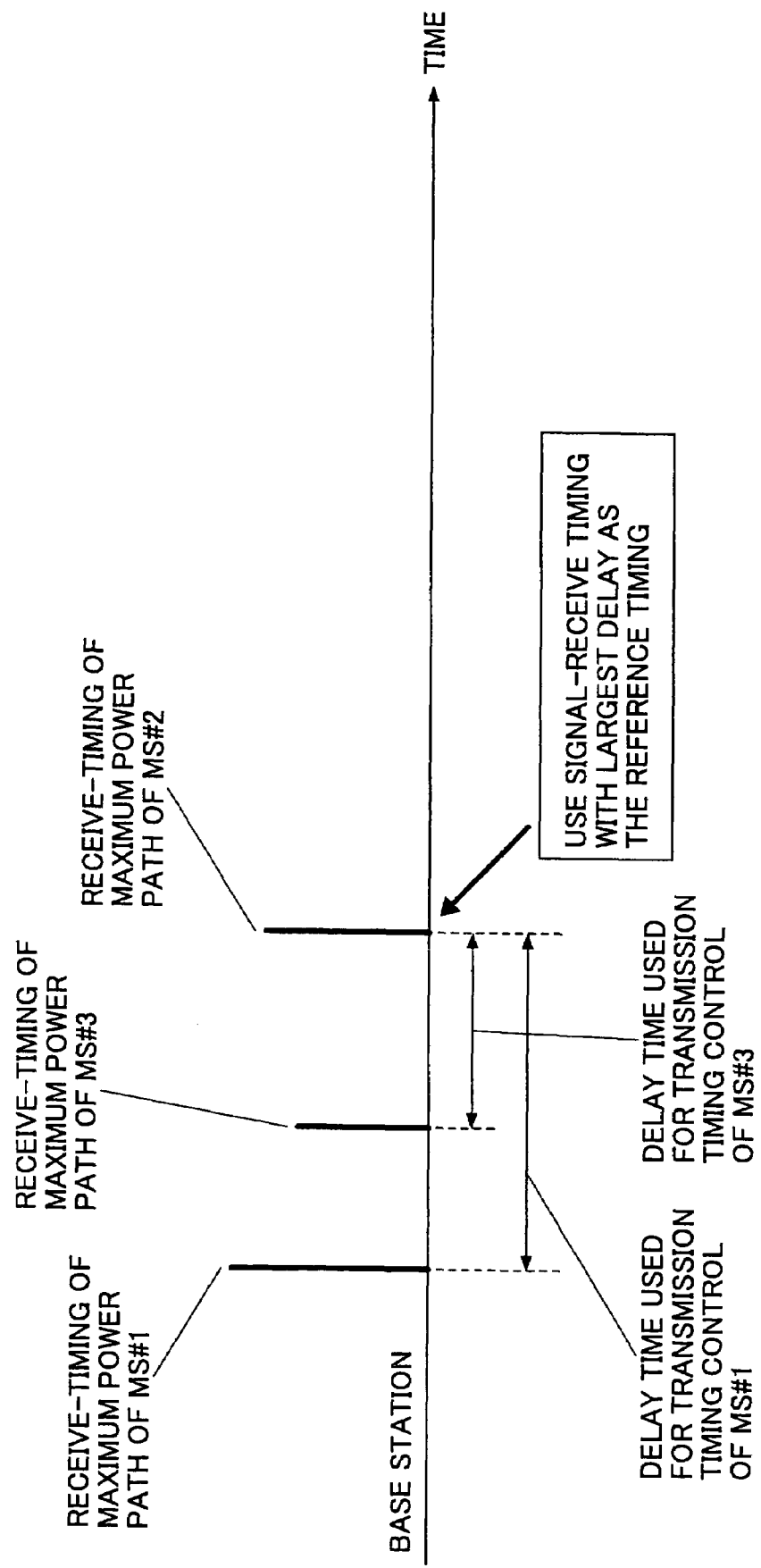
FIG. 5 is a schematic diagram showing an example of estimation of transmission time adjustment carried out by the transmission timing control unit of the base station.
Figure 6:
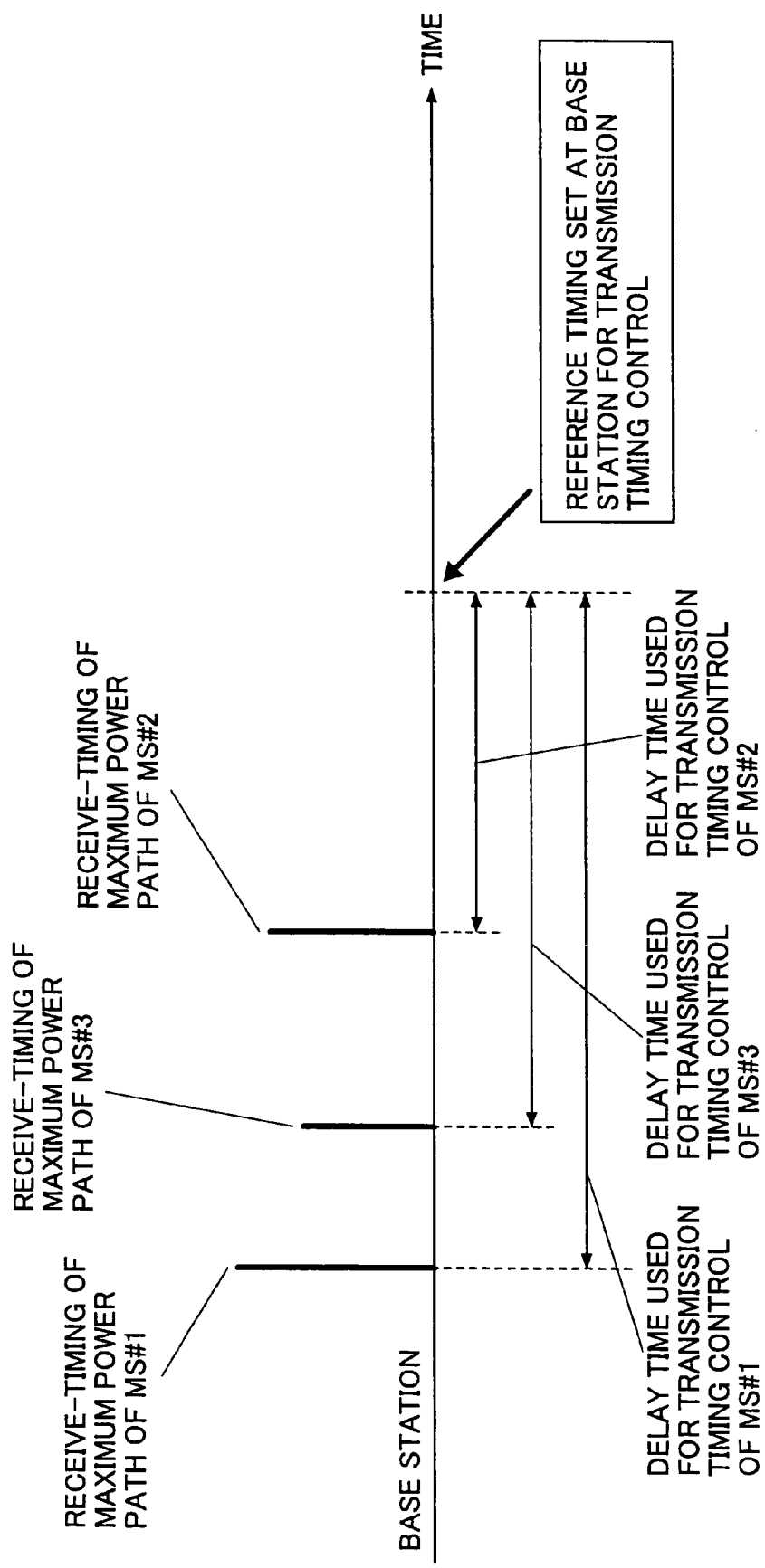
FIG. 6 is a schematic diagram showing another example of estimation of transmission time adjustment carried out at the base station.

FIG. 5 and FIG. 6 illustrate examples of calculation of the transmission timing adjusting parameter carried out by the transmission timing control unit 30 of the base station (see FIG. 3).

In FIG. 5, among the maximum power paths of the respective mobile stations detected by the path searching unit 23 of the base station, the transmission timing control unit 30 selects a maximum power path with the largest delay in receive timing, and uses the receive timing of this path as the reference timing. In the example shown in FIG. 5, the receive timing of the maximum power path of the mobile station #2 is selected as the reference timing.

The transmission timing control unit 30 measures the delay (or the time difference) between the reference timing and the maximum power path receiving timing of each of the remaining mobile stations (#1 and #3 in this example). The transmission timing control unit 30 estimates transmission timing (or calculates a transmission timing adjusting parameter) for each of the mobile stations based on the measuring result.

In FIG. 6, the reference timing is set in advance at the base station. The time delay is the difference between the reference timing and the receive timing of the maximum power path of each mobile station, and this time delay is used to control the transmission timing of each mobile station.

In the examples shown in FIG. 5 and FIG. 5, delay time is used as the time information for adjusting transmission timing of each mobile station. However, the reference timing may be set so as to measure advancing time of the receive timing of the maximum power path.

The transmission timing control unit 30 of the base station generates transmission timing control information for each of the mobile stations based on the measured time differences (or time delays) among the receive timings of maximum power paths. The transmission timing control information contains an information item representing the calculated adjusting time for controlling the transmission timing and an information item representing the polarity indicating whether the transmission timing of the packet data channel is to be put ahead or put behind.

The information item of the adjusting time may be represented by absolute time, or alternatively, it may be represented by an n value (n is an integer greater than zero) that is to be multiplied by one oversampling unit time.

The transmission timing control information generated is multiplexed in the downlink channel and supplied to each of the mobile station.

Figure 7:
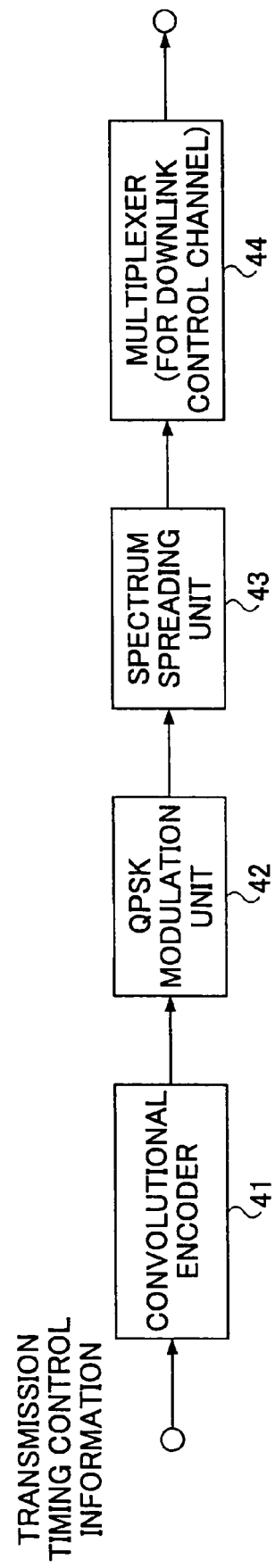
FIG. 7 is a block diagram of the transmission unit of the base station, which multiplexes transmission timing control information on downlink control channels.

FIG. 7 is a block diagram of the transmit front end of the base station, which combines the transmission control information with the downlink control channel.

The transmit front end includes a convolutional encoder 41, a QPSK modulation unit 42, a spectrum spreading unit 43, and a multiplexing unit 44 for multiplexing the transmission control information in the downlink control channel. The convolutional encoder 41 performs convolutional encoding on the transmission timing control information and outputs the coded data to the QPSK modulation unit 42. The QPSK modulation unit 42 performs QPSK modulation on the convolutaional-coded data. The spectrum spreading unit 43 performs spectrum spread on the QPSK-modulated data, which are then multiplexed in the downlink control channel by the multiplexing unit 44.

In this embodiment, the transmission timing control information that has been subjected to necessary processing is combined with the downlink control channel. However, the transmission timing control information may be first combined with other control information, and then the multiplexed control information may be subjected to the convolutional coding, QPSK modulation, and spectrum spreading, and then the processed control information may be multiplexed in the downlink data channel. In the multiplexing process, either code multiplexing or time multiplexing may be employed.

FIG. 8 is a schematic diagram illustrating an uplink access slot, which is divided into a reservation access slot and a packet data channel access slot. Each mobile station divides the uplink access slot into slot portions according to the sync information contained in the broadcast information from the base station, and transmits a reservation packet using a portion of the access slot. Consequently, the base station receives the reservation packet without collision with other packets from other mobile stations, and it can detect a time difference in receive timing of reservation packets among mobile stations, required for transmission timing control, in a stable manner.

FIG. 9 is a schematic diagram illustrating transmission timing control according to the second embodiment of the invention. In the second embodiment, the base station has a tracking feature for causing the time difference in receive timing to converge within a prescribed range when the difference in receive timing of the packet data channel of a mobile station is beyond the prescribed range.

In the second embodiment, the transmission timing control is applied to the same wireless communications system as that in the first embodiment, and therefore, explanation is made of only the modified part.

In FIG. 9, the base station performs the transmission timing control based on the difference in receive timing of the reservation packets from the mobile stations #1 and #2. The mobile stations #1 and #2 transmit packet data channels according to the transmission timing control information supplied from the base station. If the difference in receive timing of the actual packet data channels between the mobile stations #1 and #2 is beyond a prescribed range, in spite of the former transmission timing control, the base station performs transmission timing control again based on the time difference in the receive timing of the packet data channels. The base station repeats the transmission timing control until the time difference in receive timing of the packet data channels converges within the prescribed range.

In this manner, the base station repeatedly performs transmission timing control until the deviation of the receive timing of the signals from the mobile stations becomes sufficiently small, that is, until the signals received at the base station from the mobile stations become orthogonal to each other. Accordingly, synchronization of the received signal can be maintained for a long time, and the communication quality of real-time traffic can be maintained high, without degradation.

FIG. 10 is a schematic diagram of a modification of the transmission timing control according to the second embodiment. In this modification, the third mobile station #3 newly makes a call under the situation where the mobile stations #1 and #2 are already in communication with the base station.

In this case, the base station measures time differences in receive timing of the reservation packet transmitted from the third mobile station #3 and the packet data channels transmitted from the already communicating mobile stations #1 and #2. Then, the base station calculates transmission timing for each of mobiles stations #1, #2, and #3, based on the measured time differences. If the time differences do not converge within the prescribed range by the first transmission timing control, the base station repeats the transmission timing control operation until the time differences converge, as has been described above.

With this modification, even if a new mobile station makes a call, orthogonalization of received signals among the already communicating mobile stations and the newly accessing mobile station can be achieved at the base station.

FIG. 11 and FIG. 12 illustrate transmission timing control according to the third embodiment of the invention. In the third embodiment, the transmission timing control is performed during soft handover and hard handover.

FIG. 11 is a schematic diagram illustrating transmission timing control performed during soft handover. In performing soft handover, the mobile station 230 starts communicating with the base station #B when the radio wave from the base station #A becomes weak. Accordingly, the mobile station 230 is in communication with both base stations #A and #B during the soft handover. In this case, the mobile station 230 selects the transmission timing control information supplied from the sector or the cell with less transmission loss. In the example shown in FIG. 11, the mobile station 230 is moving into the cell of the base station #B. In the cell overlapping area, the mobile station 230 uses the transmission timing control information supplied from base station #A to adjust the transmission timing of the packet data channel because the transmission loss between the mobile station 230 and the base station #A is smaller than that between the mobile station 230 and the base station #B.

FIG. 12 is a schematic diagram illustrating transmission timing control performed during hard handover. In hard handover, the mobile station 230 switches its communicating from the former-connected base station to the target base station when the radio wave from the target base station becomes stronger than that from the former-connected base station. For example, when the mobile station 230 is moving from the area of base station #B to the area of base station #A, the mobile station 230 performs transmission timing control of the packet data channel based on the transmission timing control information from the target base station, that is, base station #A in this case.

By applying the transmission timing control to both soft handover and hard handover, orthogonalization of signals received from mobile stations can be maintained, while guaranteeing the mobility of the mobile stations. The frequency use efficiency can also be maintained high.

The present invention is not limited to the above-described embodiments, but has various modifications and substitutions within the scope of the invention. For example, although the invention has been explained using an example applied to a cellular system under the multi-cell environment, the present invention is also applicable to a hot spot area in the isolated (or indoor) cell environment.

In the first embodiment, the receive timing of the maximum power path with the largest time delay is used as the reference timing; however, the receive timing of the maximum power path of an arbitrary mobile station may be used as the reference timing. In this case, a time difference of each maximum power path with respect to the reference timing is calculated for each of the mobile stations.

This patent application is based on and claims the benefit of the earlier filing date of Japanese Patent Application No. 2003-364756 filed Oct. 24, 2003, the entire contents of which are hereby incorporated by reference.

What is claimed is:

1. A mobile station performing wireless communication with a base station using a DS-CDMA scheme, the mobile station comprising:
    a packet transmission unit configured to transmit a timing difference detection packet and a data packet, the timing difference detection packet and the data packet being coded in accordance with the DS-CDMA scheme in which data being transmitted is multiplied by a common scramble code for users in a cell and in which spreading codes orthogonal to each other are used to provide for simultaneous user access in the cell to the base station, the timing difference detection packet being configured to allow the base station to detect deviation in receive timing among a plurality of mobile stations, the data packet being configured to communicate data to the base station; and
    a transmission timing adjusting unit configured to adjust transmission timing of the data packet according to transmission timing control information received from the base station, wherein
    the transmission timing control information includes a transmission timing adjusting time interval to synchronize receive timings at the base station of respective data packets transmitted from the mobile stations, the transmission timing adjusting time interval being determined based on a time difference between a reference timing predefined at the base station and a receive timing of the timing difference detection packet at the base station, and
    the transmission timing control information further including a polarity information item indicating whether to put the transmission timings of the mobile stations ahead or behind the transmission timing adjusting time interval, and
    if the synchronization of the receive timings fails at the base station through the transmission timing adjusting time interval determined based on the time difference between the reference timing and the receiving timing of the timing difference detection packet, the transmission timing adjusting time interval is further adjusted based on a timing difference between the reference timing and a receive timing of the data packet.

2. The mobile station of claim 1, wherein the timing difference detection packet is a reservation packet transmitted using a slotted ALOHA random access scheme.

3. The mobile station of claim 1, wherein the packet transmission unit transmits the timing difference detection packet prior to transmitting the packet data.

4. The mobile station of claim 1, further comprising:
    an access slot dividing unit configured to divide an access slot allocated to the mobile station into a reservation packet access slot and a packet data access slot, based on broadcast information from the base station.

5. The mobile station according to claim 1, wherein the receive timing from a mobile station is chosen from a maximum power path of each path of the plurality of mobile stations.

6. A base station that communicates with a plurality of mobile stations, each mobile station performing wireless communication with the base station using a DS-CDMA scheme, the base station comprising:
    a signal processing unit configured to detect a signal receive timing from one of the mobile stations based on a timing difference detection packet and a data packet transmitted from said one of the mobile stations using the DS-CDMA scheme in which data being transmitted is multiplied by a common scramble code for users in a cell and in which spreading codes orthogonal to each other are used to provide for simultaneous user access in the cell, the timing difference detection packet being configured to the base station to detect deviation in receive timing among the mobile stations, the data packet being configured to communicate data to the base station; and
    a transmission timing control unit configured to detect differences in signal receive timings from the plurality of mobile stations and produce transmission timing control information for each of the plurality of mobile stations, based on the detection result, wherein
    the transmission timing control includes a transmission timing adjusting time interval to synchronize receive timings at the base station of respective data packets transmitted from the mobile stations, the transmission timing adjusting time interval being determined based on a time difference between a reference timing predefined at the base station and a receive timing of the timing difference detection packet at the base station, and
    the transmission timing control information further includes a polarity information item indicating whether to put the transmission timings of the mobile stations ahead or behind the transmission timing adjusting time interval, and if the synchronization of the receive timings fails at the base station through the transmission timing adjusting time interval determined based on the time difference between the reference timing and the receive timing of the timing difference detection packet, the transmission timing adjusting time interval is further adjusted based on a timing difference between the reference timing and a receive timing of the data packet.

7. The base station of claim 6, wherein the signal processing unit receives a reservation packet as the timing difference detection packet, the reservation packet being transmitted from said one of the mobile stations using a slotted ALOHA random access scheme.

8. The base station of claim 6, wherein the transmission timing control unit is further configured to supply the calculated transmission timing with the reference timing as the transmission timing control information to each of the mobile stations.

9. The base station of claim 6, wherein the transmission timing control unit measures a deviation of signal receive timing due to transmission delay among mobile stations, based on the timing difference detection packet from the mobile station.

10. The base station of claim 6, wherein the signal processing unit detects a receive timing of the packet data transmitted from the mobile station after the transmission timing control, and the transmission timing control unit detects second differences in receive timings of the packet data among the mobile stations, and wherein if the detected second differences are beyond a prescribed range, the transmission timing control unit produces second transmission timing control information including a second reference timing for controlling transmission timing of the next packet data for each of the mobile stations.

11. The base station of claim 10, wherein the transmission timing control unit has a tracking feature for repeating detection of difference in packet data receive timing and production of associated transmission timing control information until the detected difference converges within a prescribed range.

12. The base station of claim 6, wherein the signal processing unit detects a receive timing of the packet data transmitted from the already communicating mobile station after the transmission timing control, as well as a receive timing of a new timing difference detection packet from a newly accessing mobile station, to control the transmission timing of the packet data for each of the mobile stations and the newly accessing mobile station, based on differences in the receive timings.

13. The base station according to claim 6, wherein the transmission timing control unit is further configured to choose the receive timing from a mobile station among the plurality of mobile stations from a maximum power path of each path of the plurality of mobile stations.

14. A wireless communications system including a base station and a plurality of mobile stations performing wireless communication with the base station in a DSCDMA scheme, wherein:

each of the mobile stations has a packet transmission unit configured to transmit a timing difference detection packet and a data packet, the timing difference detection packet and the data packet being coded in accordance with the DS-CDMA scheme in which data being transmitted is multiplied by a common scramble code for users in a cell and in which spreading codes orthogonal to each other are used to provide for simultaneous user access in the cell to the base station, the timing difference detection packet being configured to allow the base station to detect deviation in receive timing among a plurality of mobile stations, the data packet being configured to communicate data to the base station; and a transmission timing adjusting unit configured to adjust transmission timing of the data packet according to transmission timing control information received from the base station; and the base station has a transmission timing control unit configured to detect a difference in signal receive timing from the mobile stations based on the timing difference detection packet, produce transmission timing control information for each of the mobile stations based on the detection result, and supply the transmission timing control information, wherein the transmission timing control information includes a transmission timing adjusting time interval to synchronize receive timings at the base station of respective data packets transmitted from the mobile station, the transmission timing adjusting time interval being determined based on a time difference between a reference timing predefined at the base station and a receive timing of the timing difference detection packet at the base station; and the transmission timing control information further includes a polarity information item indicating whether to put the transmission timings of the mobile stations ahead or behind the transmission timing adjusting time interval, and if the synchronization of the receive timings fails at the base station through the transmission timing adjusting time interval determined based on the time difference between the reference timing and the receive timing of the timing difference detection packet, the transmission timing adjusting time interval is further adjusted based on a timing difference between the reference timing and a receive timing of the data packet.

15. The wireless communication system according to claim 14, wherein the transmission timing control unit is further configured to choose the receive timing from a mobile station among the plurality of mobile stations from a maximum power path of each path of the plurality of mobile stations.

16. A wireless communications method for allowing wireless communication between a base station and a plurality of mobile stations, each mobile station performing wireless communication with the base station using a DS-CDMA scheme, the method comprising the steps of:

receiving at the base station a timing difference detection packet and a data packet from each of the mobile stations using a random access scheme, transmissions from each of the mobile stations being made using the DS-CDMA scheme in which data being transmitted is multiplied by a common scramble code for users in a cell and in which spreading codes orthogonal to each other are used to provide for simultaneous user access in the cell;

detecting a signal receive timing from each of the mobile stations based on the timing difference detection packet;

comparing the signal receive timing with a reference timing;

producing transmission timing control information for each of the mobile stations based on the comparison result; and transmitting the transmission timing control information to the associated mobile station to cause the mobile station to adjust the transmission timing of the data packet wherein the transmission timing control information includes a transmission timing adjusting time interval to synchronize receive timings at the base station of respective data packets transmitted from the mobile stations, the transmission timing adjusting time interval being determined based on a time difference between the reference timing predefined at the base station and the signal receive timing of the timing difference detection packet at the base station, the transmission timing control information further includes a polarity information item indicating whether to put the transmission timings of the mobile stations ahead or behind the transmission timing adjusting time interval, and if the synchronization of the receive timings fails at the base station through the transmission timing adjusting time interval determined based on the time difference between the reference timing and the receive timing of the timing difference detection packet, the transmission timing adjusting time interval is further adjusted based on a timing difference between the reference timing and a receive timing of the data packet.

17. The wireless communication method according to claim 16, wherein said step of producing transmission timing control information further includes:

choosing the receive timing from a mobile station among the plurality of mobile stations from a maximum power path of each path of the plurality of mobile stations.

* * * * *